United States Patent
Chen et al.

(10) Patent No.: US 6,233,116 B1
(45) Date of Patent: May 15, 2001

(54) THIN FILM WRITE HEAD WITH IMPROVED LAMINATED FLUX CARRYING STRUCTURE AND METHOD OF FABRICATION

(75) Inventors: Yingjian Chen, Fremont; Zhupei Shi, San Jose; Syed Hossain, Fremont, all of CA (US)

(73) Assignee: Read-Rite Corporation, Fremont, CA (US)

(*) Notice: Subject to any disclaimer, the term of this patent is extended or adjusted under 35 U.S.C. 154(b) by 0 days.

(21) Appl. No.: 09/192,388

(22) Filed: Nov. 13, 1998

(51) Int. Cl.⁷ .................................................. G11B 5/147
(52) U.S. Cl. ............................................................ 360/126
(58) Field of Search .................................... 360/125, 126; 427/130, 128; 428/611, 694 NF, 694 MM, 694 EL, 698

(56) References Cited

U.S. PATENT DOCUMENTS

| | | | |
|---|---|---|---|
| 5,108,837 | * 4/1992 | Mallary | 428/336 |
| 5,132,859 | * 7/1992 | Andricacos et al. | 360/126 |
| 5,142,426 | 8/1992 | Re et al. | 360/126 |
| 5,187,628 | * 2/1993 | Kanai et al. | 360/126 |
| 5,224,002 | * 6/1993 | Nakashima et al. | 360/126 |
| 5,313,356 | * 5/1994 | Ohkubo et al. | 360/126 |
| 5,589,221 | 12/1996 | Hiramoto et al. | 427/130 |
| 5,590,008 | * 12/1996 | Tanabe et al. | 360/126 |
| 5,663,857 | * 9/1997 | Kumura et al. | 360/126 |
| 5,736,264 | 4/1998 | Ishiwata et al. | 360/126 |
| 5,750,251 | 5/1998 | Ohji | 428/332 |
| 5,750,275 | 5/1998 | Katz et al. | 360/126 |
| 5,751,528 | * 5/1998 | Nepela et al. | 360/126 |
| 5,792,547 | * 8/1998 | Liu et al. | 428/212 |

OTHER PUBLICATIONS

Kohmoto, Osamu, "Recent Development of Thin Film Materials for Magnetic Heads," *IEEE Transactions on Magnetics,* vol. 27, No. 4, Jul. 1991, pp. 3640–3647.

(List continued on next page.)

*Primary Examiner*—David L. Ometz
(74) *Attorney, Agent, or Firm*—Oppenheimer Wolff & Donnelly, LLP

(57) ABSTRACT

The present invention provides a thin film write head having an improved laminated flux carrying structure and method of fabrication. The preferred embodiment provides laminated layers of: high moment magnetic material, and easily aligned high resistivity magnetic material. In the preferred embodiment, the easily aligned laminating layer induces uniaxial anisotropy, by exchange coupling, to improve uniaxial anisotropy in the high moment material. This allows deposition induced uniaxial anisotropy by DC magnetron sputtering and also provides improved post deposition annealing, if desired. It is preferred to laminate FeXN, such as FeRhN, or other crystalline structure material, with an amorphous alloy material, preferably Co based, such as CoZrCr. In the preferred embodiment, upper and lower pole structures may both be laminated as discussed above. Such laminated structures have higher $B_s$ than structures with insulative laminates, and yokes and pole tips and may be integrally formed, if desired, because flux may travel along or across the laminating layers. The preferred embodiment of the present invention improves soft magnetic properties, reduces eddy currents, improves hard axis alignment while not deleteriously affecting the coercivity, permeability, and magnetostriction of the structure, thus allowing for improved high frequency operation.

23 Claims, 6 Drawing Sheets

OTHER PUBLICATIONS

Li, S., Freitas, P.P., Rogalski, M.S., Azevedo, M., Sousa, J.B., Dai, Z.N., Soares, J.C., Matsakawa, N., and Sakakima, H., "Magnetic properties and structure of a new multilayer [FeTaN/TaN]n for recording heads," *J. Appl. Phys.,* 81(8), Apr. 15, 1997, pp. 4501–4503.

Barnard, J.A., Tan, M., Waknis, W., and Haftek, E., "Magnetic properties and structure of Al/Fe–N periodic multilayer thin films," *J. Appl. Phys.,* 69(8), Apr. 15, 1991, pp. 5298–5300.

Hong, Jongill, Sin, Kyusik, Lee, Nguyentran, and Wang, Shan X., "Soft Magnetic Properties and Microstructures of FeRhN High Moment Thin Films," *IEEE Transactions of Magnetics,* vol. 33, No. 5, Sep. 1997.

Inturi, V.R. and Barnard, J.A., "Studies of laminated and single layer high moment soft FeTaN films, "*J. Appl. Phys.,* 81(8), Part 2, Apr. 15, 1997, pp. 4504–4506.

Katori, Kenji, Hayashi, Kazuhiko, Hayakawa, Masatoshi, and Aso, Koichi, "Soft Magnetic Properties for Fe–Al–N/Si–N Multilayered Films," *Journal of The Magnetics Society of Japan,* vol. 13, Supplement No. S1, 1989, pp. 335–339.

Kubota, K., and Naoe, M., "Magentic properties of Fe–N/Al–N multilayered films prepared by ion–assisting sputtering," *J. Appl. Phys.,* 69 (8), Apr. 15, 1991, pp. 5295–5297.

Maass, W., and Rohrmann, H., Improved Magnetic Anistropy and Magnetostriction by Laminating FeAl(N) with Permalloy to Multilayers, *IEEE Transactions on Magnetics,* vol. 34, No. 4, Jul. 1998, pp. 1435–1437.

Makino, S., Shinkai, S., Nakamura, T., Yabuta, M., and Kitamura, M., "High Density Recording FeTaN Laminated Hard Disk Heads," *IEEE Transactions on Magnetics,* vol. 29, No. 6, Nov. 1993, pp. 3882–3884.

Nguyentran, N., Sin, Kyusik, Hong, Jongill, Pizzo, Patrick P., and Wang Shan X., "Corrosion Resistance of Low Coercivity, High Moment FeXN (X= Rh, Mo, Thin Film Head Materials," Jan. 1997.

Russak, Michael A., Jahnes, Christopher V., Klokholm, Erik, Lee, Jo–Won, Re, Mark E., and Webb, Bucknell C., "Magnetic and structural characterization of sputtered FeN multilayer films," *J. Appl. Phys.,* 70 (10), Nov. 15, 1991, pp. 6427–6429.

Slonczewski, John C. Petek, Bojan, and Argyle, Bernell E., Micromagnetics of Laminated Permalloy Films, *IEEE Transactions on Magnetics,* vol. 24, No. 3, May 1998.

van de Riet, E., Klaassens, W., and Roozeboom, F., "On the origin of the uniaxial in nanocrystalline soft–magnetic materials," *J. Appl. Phys.,* 81 (2), Jan. 15, 1997, pp. 806–814.

Wang, Shan Xiang, "Thin Film Recording Heads Using High Moment Soft Magnetic Materials," *A Dissertation submitted to the Graduate School in Partial Fullfillment of the Requirements for the Degree of Doctor of Philosophy in Electrical and Computer Engineering,* Carnegie Mellon University, Nov. 19, 1993.

Wang, S., Liu, F., Maranowski, K.D., and Kryder, M.H., "Fabrication and Performance of High Moment Laminated FeAln Thin Film Inductive Recording Heads," *IEEE Transactions on Magnetics,* vol. 30, No. 2, Mar. 1994.

Wang, S., Obermyer, K.E., and Kryder, M.H., "Improved High Moment FeAlN/SiO2 Laminated Materials for Thin Film Recording Heads," *IEEE Transactions on Magnetics,* vol. 27, No. 6, Nov. 1991, pp. 4879–4881.

Sin, Kyusik, and Wang, Shan, X., "FeN/AlN Multilayer Films For High Moment Thin Film Recording Heads," *IEEE Transactions on Magnetics,* vol. 32, No. 5, Sep. 1996, pp. 3509–3511.

Nago, K., Aokura, I., Yamanishi, H., Sakakima, H., and Osano, K., "Substrate Bias Effect on the Magnetic Properties of Fe–Ta–N Films," *IEEE Translation Journal On Magnetics In Japan,* vol. 8, No. 12, Dec. 1993, pp. 934–940.

Li, Shuxiang, and Freitas, P.P., "Magnetic properties and structure of a new multilayer [FeTaN/TaN]n for recording heads," *J. Appl. Phys.* 81 (8), Apr. 15, 1997.

Jones, R.E., Jr., "Magnetic Properties of Fe(N)/NiFe(N) Sputtered on Sloping Surfaces," *IEEE Transactions on Magnetics,* vol. 32, No. 5, Sep. 1996, pp. 4588–4590.

Wang, Shan Xiang, "Thin Film Recording Heads Using High Moment Soft Magnetic Materials," *A Dissertation submitted to the Graduate School in Partial Fulfillment of the Requirements for the Degree of Doctor of Philosophy in Electrical and Computer Engineering,* Carnegie Mellon University, Nov. 19, 1993 (pp. 1–145).

* cited by examiner

THIN FILM WRITE HEAD WITH IMPROVED LAMINATED FLUX CARRYING STRUCTURE AND METHOD OF FABRICATION

BACKGROUND OF THE INVENTION

1. Technical Field

The present invention relates to the field of thin film write heads.

2. Background Art

Data is stored on magnetic media by writing on the magnetic media using a write head. Magnetic media can be formed in any number of ways, such as tape, floppy diskette, and hard disk. Writing involves storing a data bit by utilizing magnetic flux to set the magnetic moment of a particular area on the magnetic media. The state of the magnetic moment is later read, using a read head, to retrieve the stored information.

Data density is determined by the amount of data stored on an area of magnetic media and depends on how much area must be allocated to each bit. Data on magnetic media is often stored in a line or track. Magnetic media often have multiple tracks. In the case of the disk, the tracks are nested annular rings. More bits per ring and more rings per disk increases data density. Data density or areal density, therefore, is determined by both the bit length and by the width of the bit. To decrease bit size, head size is decreased by fabricating thin film read and write heads. Thin film heads commonly employ separate write and read heads.

Thin film write heads are typically formed by depositing and etching layers of magnetic, non-magnetic, dielectric, and electrically conductive materials to form the structures of the head, such as a core, a conductor winding, and upper and lower pole tips and yokes. Write heads typically do not contact the magnetic media but instead are separated from the magnetic media by a layer of air or air bearing. Magnetic flux generated between poles of the write head acts across the air bearing to change the magnetic moment of an area on the magnetic media.

Since 1991, the compound growth rate of areal density in hard disk drives has been an accelerated 60% per year. One of the major challenges for magnetic recording heads is to develop high moment writer materials. Higher moment writer materials can generate sufficiently high flux to write and overwrite media with high coercivity. High medium coercivity is essential for sustaining small magnetic bits consisting of narrow transitions.

In order for high moment material to be useful for write head applications, several requirements have to be met. The material must be magnetically soft with low coercivity value, and it also must have high permeability and low magnetostriction. As ever smaller structures must handle higher magnetic flux, the write head structures, and in particular the yoke and pole tips, become susceptible to saturation. As a result, it is necessary to form the yoke and pole structures of material with a sufficiently high magnetic moment to handle high flux density without saturating.

The rate or frequency that data is stored to the media is an important measure of the operational performance of the write head. One problem with operating at higher frequency is that the permeability of the material diminishes. As the magnetic flux changes, it generates a corresponding electrical field encircling the magnetic flux, opposing the change. In an electrically conducting material, the induced electrical field generates current, referred to as eddy current, which in turn generates an opposing magnetic field. This not only limits flux switching time, but also causes saturation near the edge of the structure, thus lowering the permeability of the structure at high frequency.

Laminating the yoke structure with a non-magnetic insulative material, such as is disclosed U.S. Pat. No. 5,750,275, by Katz et al., entitled THIN FILM HEADS WITH INSULATED LAMINATION FOR IMPROVED HIGH FREQUENCY PERFORMANCE, issued May 12, 1998, herein incorporated by reference in its entirety, improves high frequency performance over conventional single layer structures. The insulative material reduces eddy currents in the structure. Nevertheless, laminating with an insulative material also causes a reduction in the magnetic moment. Another drawback with this structure is that the non-magnetic laminating layers must be stopped short of the air bearing surface to allow flux to travel toward the write gap within the pole tip.

To improve the permeability and flux rise time at high frequency, the yoke and pole material are often formed with a low but non-zero induced uniaxial anisotropy. The induced uniaxial anisotropy controls the magnetic domain pattern of the material. A hard-axis state, one where the magnetization domains are oriented perpendicular to the flux path, is necessary to ensure that the magnetization change is conducted via rotation. This maximizes the high frequency permeability.

The uniaxial anisotropy may be induced by applying a magnetic field, or by applying an anisotropic stress to the material during deposition. In current applications, an RF sputtering process is often employed to deposit high moment materials during which an aligning magnetic field is also applied. Such RF sputtering techniques, however, are not practical for multilayer laminated devices. RF sputtering techniques, have low throughput so provide a significant impediment to commercial viability of multilayer laminated devices. A DC magnetron sputtering process, which is superior in producing high quality films with high throughput, often results in the reduction in the effectiveness of aligning field, consequently, the deposited films have poorly defined anisotropy direction.

When dispersion in the local anisotropy axes directions is significant in the as-deposited films, annealing in a magnetic field is often used. The annealing conditions which are needed to induce well-defined anisotropy in the writer, however, often causes the loss of antiferromagnetic coupling as well as undesirable interdiffusion in the reader part of the GMR type devices.

BRIEF SUMMARY OF THE INVENTION

The present invention provides a thin film write head having an improved laminated flux carrying structure and method of fabrication. Some, or all, of the flux carrying structures of the write head may employ the laminate structure of the present invention.

The laminated thin film structure of the present invention provides at least one layer of high moment magnetic material adjacent a laminating layer. The laminating layer of the preferred embodiment is formed of a high resistivity magnetic material to improve soft magnetic properties, reduce eddy currents, an improve hard axis alignment allowing for high frequency operation.

With the present invention, it is preferred that the laminating layer be formed of a magnetic material that utilizes a relatively small alignment field to induce uniaxial anisotropy and that the laminating layer be used to exchange couple with the high moment magnetic layer to improve uniaxial anisotropy in the high moment material. The lamination layer may utilize the uniaxial anisotropy of an easily aligned magnetic material to induce uniaxial anisotropy in the high moment layer, which would otherwise require a relatively large alignment field to define uniaxial anisotropy.

By utilizing exchange coupling with an easily aligned magnetic material, uniaxial anisotropy may be induced during deposition using a lower applied magnetic field. As such, the preferred embodiment of the present invention may be commercially manufactured by DC magnetron sputtering. This provides improved throughput and yield.

The structure and method of the present also allows for improved alignment utilizing post deposition annealing, if desired. An easily aligned laminating layer more easily may be aligned post deposition by utilizing exchange coupling between the laminating layer to induce uniaxial anisotropic alignment in the high moment material. Thus lower annealing temperatures may be used to induce uniaxial anisotropy in the high moment material after deposition.

It is preferred to use an easily aligned amorphous alloy material for the laminating layer. In the preferred embodiment, a cobalt based amorphous material, such as CoZrCr may be used for the laminating layer. The advantage of amorphous cobalt based films, such as CoZrX, where X is Cr, Ta, Nb, Hf, or other similar material, is that they have a relatively high resistivity which reduces eddy currents, as discussed above, and they are easily aligned either by DC magnetron sputtering or by post deposition annealing.

The high moment material is preferably formed of a material capable of forming crystalline structure. In the preferred embodiment, the high moment material may be FeXN, where X is Rh, Al, Ta, Zr, Ti, Hf, Cr, V, Nb, Mo, Si, or other similar material.

In the preferred embodiment, upper and lower pole structures may both be laminated in accordance with the preferred embodiment discussed above. In structures laminated with magnetic material, flux may travel along the laminating layers as well as the high moment layers. As such, structures laminated with magnetic material have a higher $B_s$ as compared to structures laminated with non-magnetic material. Furthermore, flux may travel across the laminating layers. This allows flux to travel toward a write gap within laminated pole tip regions, thus allowing pole tips and yoke structures to be integrally formed, if desired, without deleteriously affecting write gap flux concentration.

Typically the yoke, and/or other pole structures, are formed of multiple layers of alternating high moment and laminating material. The preferred embodiment of the present invention allows 10, or more, laminated layers to be manufactured commercially.

The preferred embodiment of the present invention not only improves soft magnetic properties and reduces eddy currents, it improves hard axis alignment allowing for high frequency operation, while not deleteriously affecting coercivity and permeability and magnetostriction of the structure. Laminating also improves the magnetic properties of high moment magnetic material on sloping surfaces.

DESCRIPTION OF THE INVENTION

The Preferred Embodiments of the Present Invention

Figure 1:
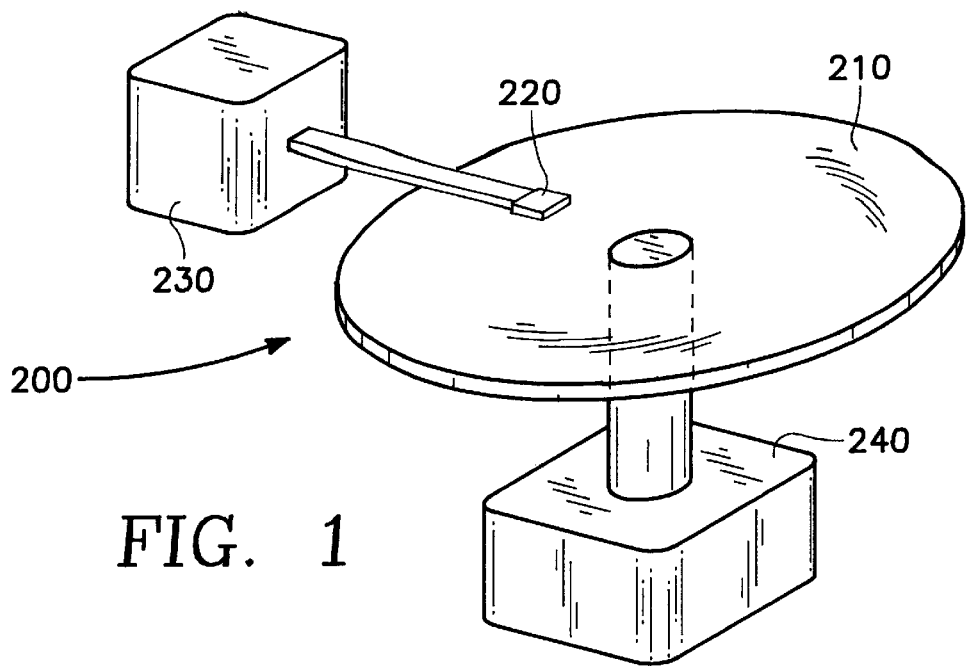
FIG. 1 illustrates a data storage and retrieval apparatus employing the write head of the present invention.

FIG. 1 is a conceptual drawing of a possible embodiment of the thin film write head of the present invention. FIG. 1 shows the thin film write head of the present invention embodied in a disk type magnetic data storage and retrieval apparatus 200. The write head of the present invention is located within a merged head assembly 220 which rides above a magnetic storage media 210, depicted in FIG. 1 as a rotatable hard disk type storage media. The hard disk 210 is coupled to a motor 240 to provide rotation of the disk relative to the head assembly 220. An actuating means 230 may be used to position the head assembly 220 above the surface of the media 210 to read and write data in the form of magnetic bits from and to the media 210. The data storage and retrieval apparatus 200, typically has several hard disks 210 and several corresponding head assemblies 220. The improved flux carrying structure of the present invention is intended to be utilized in all known data storage and retrieval apparatuses. By way of non-exclusive example, the present invention is also intended to improve magnetic tape type storage and retrieval apparatuses, or any other known types of magnetic storage and retrieval apparatuses.

Figure 2:
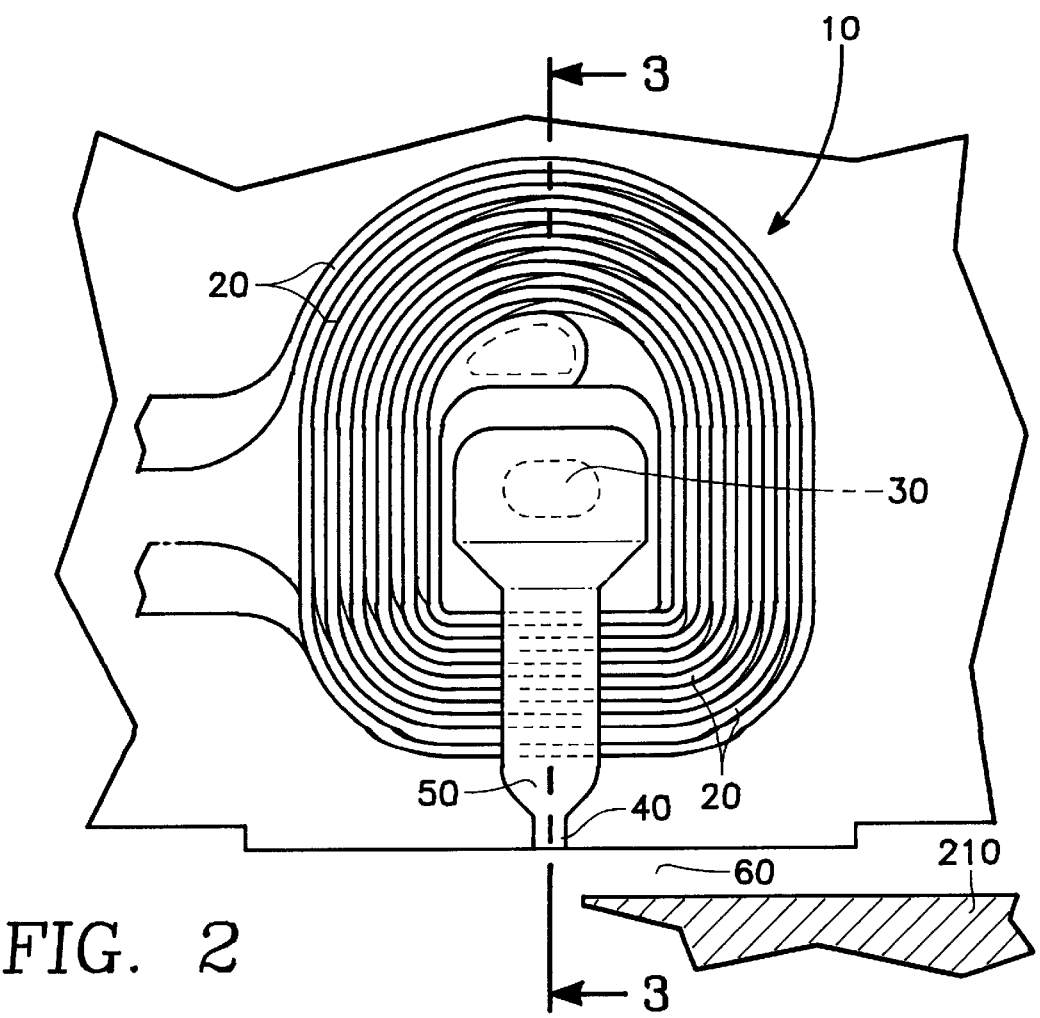
FIG. 2 shows a cross sectional cut away of a possible embodiment of the write head of the present invention.

FIG. 2 depicts a partial cut away top view of an embodiment of the thin film write head 10 of the present invention. Conductors 20 encircle a core 30 to produce magnetic flux in the core 30. The flux generated in the core 30 is coupled to the an upper pole tip 40 via a yoke 50 and returns through a lower pole tip 80 and a lower pole layer 85, shown in FIG. 4, which is coupled to the core 30. The flux generated across a write gap 70, shown in FIG. 4 between the upper pole tip 40 and the lower pole tip 80, writes across an air bearing 60 to a magnetic media 210 which is moved with respect to the write head 10.

Figure 3:
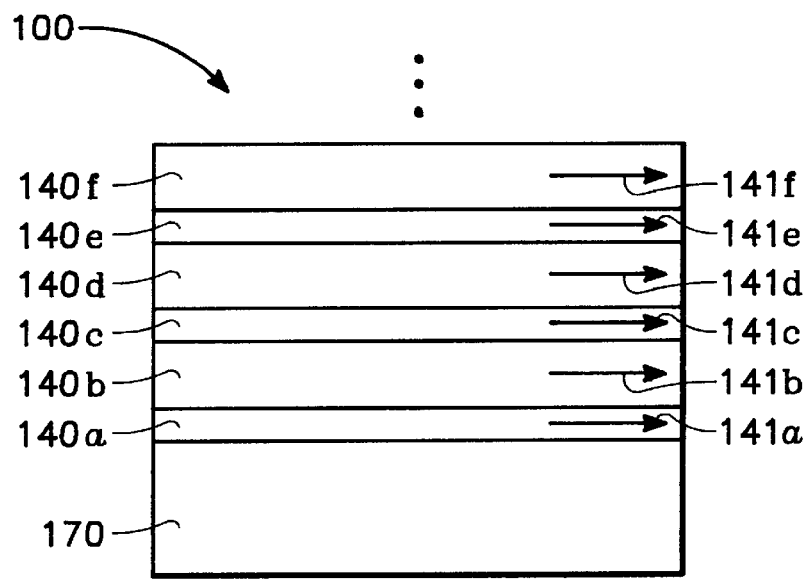
FIG. 3 illustrates a cross sectional view of a preferred embodiment of a flux carrying structure of the present invention.

FIG. 3 illustrates a laminated thin film structure 100 utilized in write head 10. The laminated structure 100 of the present invention provides improved flux carrying capabilities over conventional structures. The laminated thin film structure 100 may be applied to some, or all, of the flux carrying structures of the write head 10.

The thin film structure 100 is typically formed on a substrate or underlying insulative layer 170, such as for example a write gap, conductor winding insulation, or other underlying layer. The laminated thin film structure 100 of FIG. 3 provides at least one layer of high moment magnetic material 140b adjacent a laminating layer 140a

In the preferred embodiment, a high resistivity magnetic material is selected for laminating layer 140*a*. The high resistivity reduces eddy currents in the structure 100, improving high frequency performance. In addition, laminating also improves the soft magnetic properties of the of the high moment magnetic material 140*b*, especially on sloping surfaces. In particular, the laminated films show reduced coercivity in both the easy and hard axes directions and higher permeability.

As is depicted in FIG. 3, several high moment layers 140*b*, 140*d*, 140*f*, or more, and several laminating layers 140*a*, 140*c* & 140*e*, or more, may be used to further improve these properties.

Forming the laminating layer 140*b* of magnetic material allows magnetic flux to travel in not only the high moment layer 140*b* but also the laminating layer 140*a*. As such, using a magnetic material rather than a non-magnetic material for the laminating layer 140*a* improves the overall permeability and high frequency saturation characteristics of the structure 100. This is particularly true if a large number of layers 140 are used.

Furthermore, using a magnetic material for laminating layer 140*a* allows magnetic flux to travel perpendicular to the film plane. Such a characteristic allows the present invention to be used at a pole tip region of the writer. Whereas non-magnetic laminating layers inhibit flux from focusing near the write gap, the magnetic laminating layer 140*a* allows for improved focusing of flux near the write gap.

A still further advantage of the preferred embodiment of the present invention is that the flux carrying structure 100 may be commercially manufactured with a high moment magnetic material having a well defined uniaxial anisotropy 141*b*. Inducing a well defined uniaxial anisotropy in high moment materials during deposition requires a large applied magnetic field at the workpiece. As such, RF diode sputtering techniques are often used. RF diode sputtering, however, is a slow process that is impractical for commercial manufacture of multilayer laminated flux carrying structures. DC magnetron sputtering, on the other hand, is a much faster process, but does not produce well defined uniaxial anisotropy across the entire workpiece.

With the preferred embodiment of the present invention, a well defined uniaxial anisotropy 141*b* is induced in the high moment magnetic layer 140*b* by exchange coupling with the laminating layer 140*a*. The laminating layer 140*a* is formed of a magnetic material that is easily aligned and does not require a large alignment field to induce uniaxial anisotropy 141*a*. This allows a well defined uniaxial anisotropy 141*b* in the as deposited structure 100 using DC magnetron sputtering.

Moreover, laminating with an easily aligned magnetic material also improves post deposition annealing. A magnetic material requiring a lower annealing temperature to induce uniaxial anisotropy may be selected as the laminating layer 140*a*. Because of its lower annealing temperature, interdiffusion is reduced and antiferromagnetic coupling may be maintained in the reader part of the merged head during the post deposition annealing.

As such, it is preferred to form laminating layer 140*a* of an amorphous material. Typically, a cobalt based material is selected for laminating layer 140*a*, such as cobalt zirconium chromium or CoZrCr in the form $Co_{90}Zr_9Cr_1$. The advantage of amorphous cobalt based films is that they have a relatively high resistivity, which reduces eddy currents as discussed above, and are easily aligned either by DC magnetron sputtering or by post deposition annealing. As such, other easily aligned materials such as CoZrX, where X is Ta, Nb, Hf, or other similar material, may be used.

In the preferred embodiment, the high moment material is preferably formed of iron nitride compounds or FeXN, where X is Rh, Al, Ta, Zr, Ti, Hf, Cr, V, Nb, Mo, Si, or other similar material.

Another advantage of the structure and method of the lamination of the present invention is that, in some applications such as FeRhN deposition on AlTiC device wafers, preheating of the device wafer for deposition can be eliminated. The exhange coupling of the laminating layer 140*a*, whether deposited before or after the high moment layer 140*b*, eliminates the need for preheating of the device wafer.

The preferred embodiment of the present invention may have several high moment layers such as 140*b*, 140*d*, & 140*f*, or more laminated with several laminating layers 140*a*, 140*c* & 140*e*, etc. As such, the preferred embodiment has multiple alternating layers of high moment 140*b*, 140*d* & 140*f* and amorphous magnetic material 140*a*, 140*c* & 140*e*, having aligned anisotropy 141*a–e* as depicted in FIG. 3. The magnetization 141*a–f* of the structure 100 is oriented perpendicular to the flux path.

Figure 4:
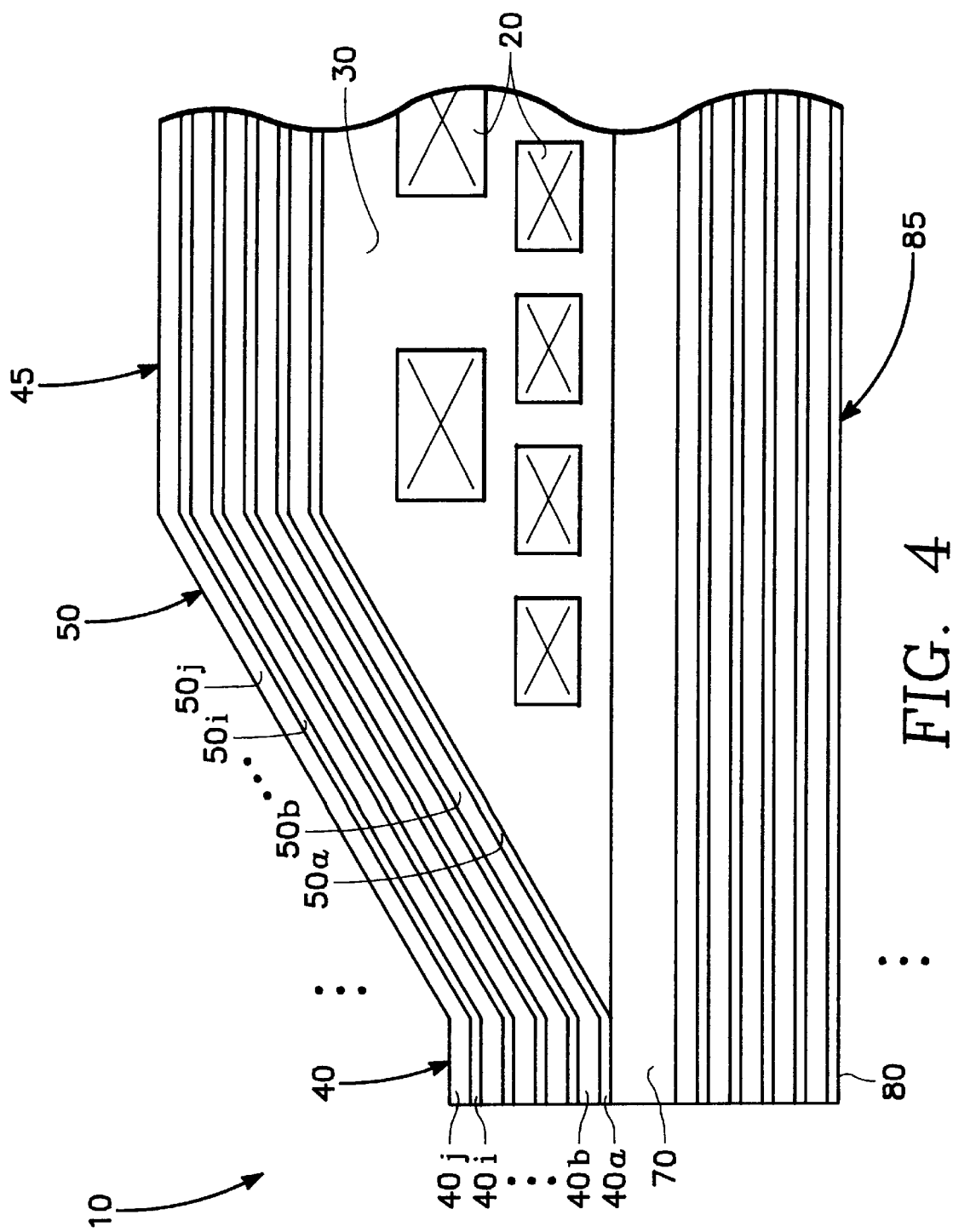
FIG. 4 illustrates cross sectional view of the write head of FIG. 2 along 4—4.

FIG. 4 illustrates a cut-away side view of a preferred embodiment of the thin film write head 10 of the present invention. In this embodiment, both an upper pole structure 45 and a lower pole structure 85 are laminated. As discussed above, the preferred embodiment of the present invention allows the pole tips 40 & 80 to be integrally formed with the rest of pole structure 45 & 85. As such, in the preferred embodiment of FIG. 4, the laminated upper pole tip 40 is integrally attached to a laminated yoke 50, which is formed over a conductor winding 20 and surrounding insulation 30.

With the embodiment of FIG. 4, the lower pole structure 85 may be formed over a previously formed read head structure or on substrate material (not shown). As discussed above, a laminating layer may be deposited on the substrate to preclude the need for preheating the substrate prior to high moment material deposition. Many alternating layers of high moment magnetic layers and laminating layers may be deposited to form the upper and lower poles 45 & 85. In some applications, ten, or more, layers may be used to form the upper, or the lower, pole structures 45 & 85.

Although the upper and lower pole tips 40 & 80 of FIG. 4 are shown integrally attached, they may be formed separately, and may have any know configuration such as disclosed in: U.S. Pat. No. 5,452,164, by Cole, et al., entitled THIN FILM MAGNETIC WRITE HEAD, issued on Sep. 19, 1995; U.S. Pat. No. 5,621,593, by Kitajima, et al., entitled MAGNETORESISTIVE HEAD AND METHOD OF FABRICATING THE SAME, issued on Apr. 15, 1997; or U.S. Pat. No. 5,438,747, by Kronubi, et al., entitled METHOD OF MAKING A THIN FILM MERGED HEAD WITH ALIGNED POLE TIPS, issued on Aug. 8, 1995, all herein incorporated by reference in their entireties. The write head 10 of the present invention may have any of the write head pole and yoke configurations known in the art. For example, embodiments of the present invention may employ pedestal, or non-pedestal type pole tips, which may be integrally formed, or separately formed from the yoke, or the pole structure.

An advantage of the preferred embodiment, as discussed above, is that not only can magnetic flux travel through the high moment layers 40*b*, 40*d*, 40*f*, 40*h* & 40*j* it may also travel through the laminating layers 40*a*, 40*c*, 40*e*, 40*g* & 40*i*. As such, using a magnetic material rather than a non-magnetic material for the laminating layers 40*a*, 40*c*, 40*e*, 40*g*, & 40*i* does not significantly reduce the permeability of the structure. It also allows magnetic flux to travel within the pole tips 40 & 80 perpendicular to the lamination layers and toward the write gap 70 prior to exiting the pole tips 40 & 80 near the write gap layer 70. This allows for more concentrated flux across the write gap 70, thus improving the performance of the write head 10.

As discussed above, a DC magnetron sputtering system may be used to form the preferred embodiment. As such, both the high moment material and the laminating material may be deposited with DC magnetron sputtering. By way of non-exclusive example, CoZrCr layers may be deposited at 2 kW at a rate of 16 Å/second for about 10 seconds in the applied magnetic field of 80 Oersted. An FeRh target having about 3% of Rh may be reactively sputtered in the presence of $N_2$/Ar using a sputtering power of 3.5 kW to deposit FeRhN at a deposition rate of 28 Å/second for about 20 seconds with a 80 oersted applied magnetic field to obtain soft and high moment FeRhN films with nanocrystalline microstructure.

The thickness of the layers 40 is selected so that the layers 40 are not too thick, allowing exchange coupling between the layers to provide well aligned anisotropy. Furthermore, the layers must not be too thin so that the high moment magnetic properties of the structure are not lost. In the one embodiment, the FeXN layer is about 500 to 600 Å and the amorphous cobalt alloy layer is about 100 to 200 Å. To optimize performance, the layers typically are formed with a high moment to laminating layer ratio of about 3 or 4 to 1.

Although FIGS. 3 & 4 are shown having a laminating layer adjacent the substrate or other non-magnetic layer, in some applications it may be desirable that the high moment layer be formed on the substrate or other underlying layer before depositing the laminating layer. For example, the high moment material layer 40*b* may be formed adjacent the write gap layer near the pole tip 40 if desired. As is also the case when the lamination layer is formed first, the prior deposited high moment layer can have a deposition induced uniaxial anisotropy provided by exchange coupling with the after deposited lamination layer.

It is also possible with such an embodiment, to perform a post deposition anneal in the presence of a magnetic field. This magnetic annealing process can induce or improve uniaxial anisotropy alignment. Uniaxial anisotropic alignment in the high moment material is induced by exchange coupling with the post deposition aligned lamination layer. Thus lower post deposition annealing temperatures may be utilized to induce uniaxial anisotropy in the high moment material.

Figure 6:
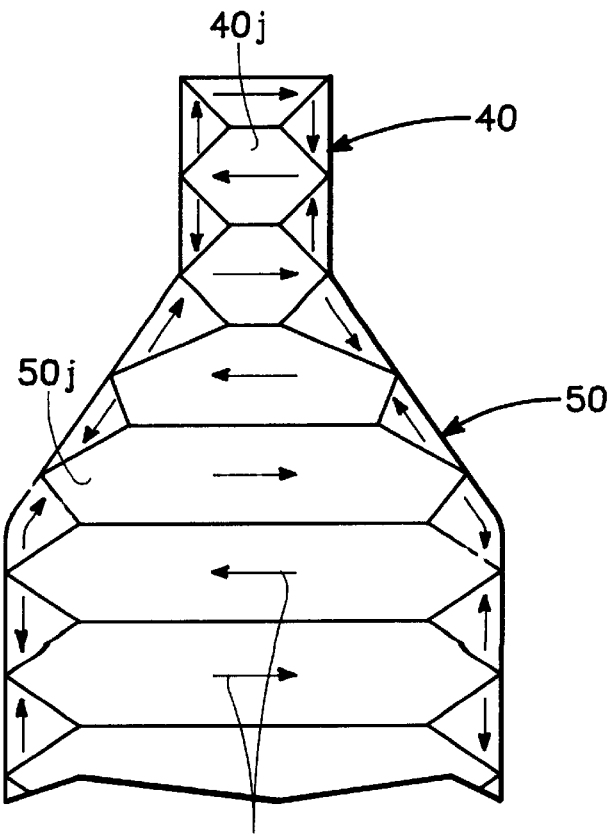
FIG. 6 illustrates a top view of a pole structure of the present invention showing well aligned uniaxial anisotropy.
Figure 5A:
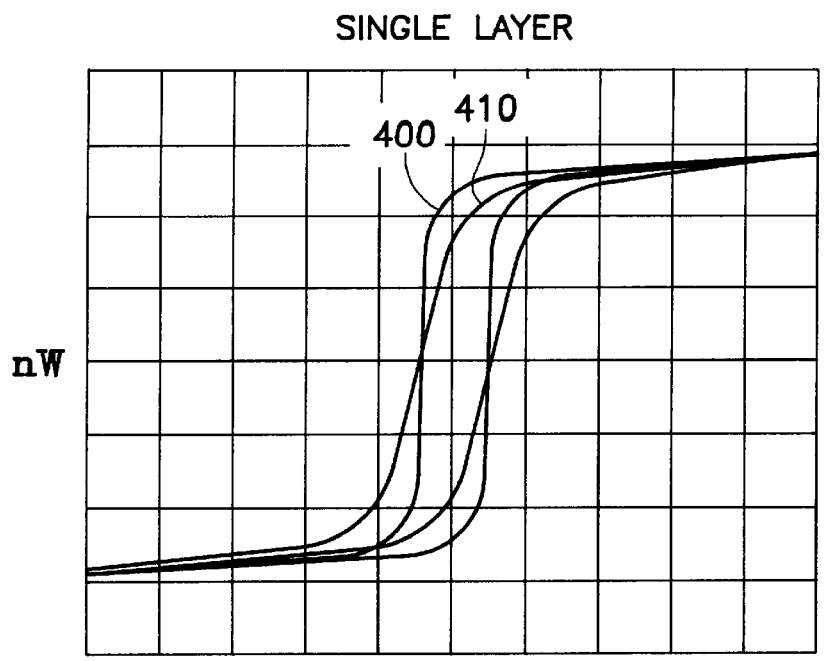
FIGS. 5A & 5B illustrate the improved magnetic properties of laminated structure of the preferred embodiment as compared to a single layer structure.
Figure 5B:
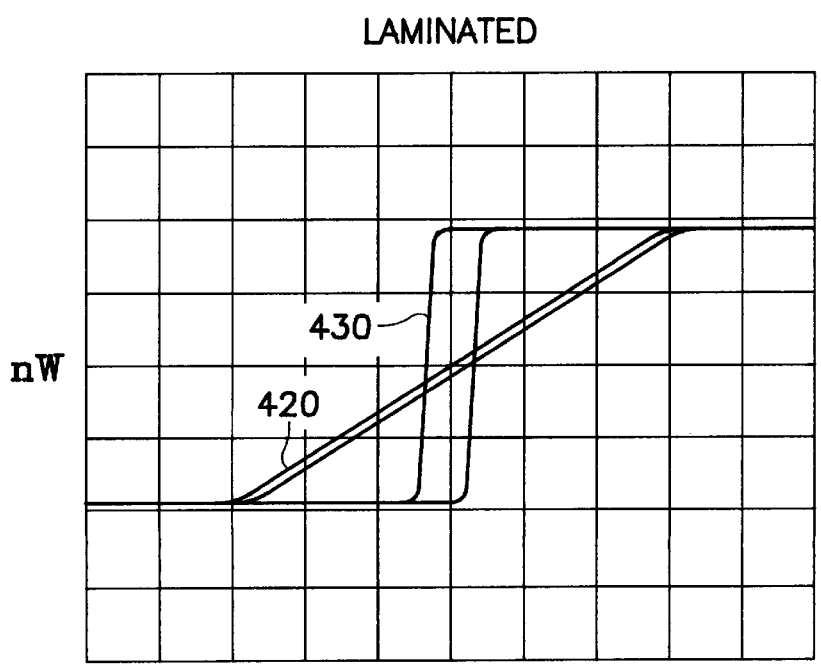
Figure 7A:
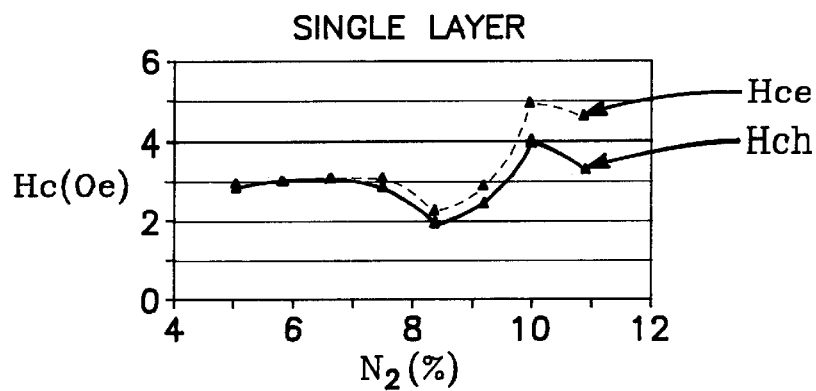
FIGS. 7A & 7B illustrate the improved coercivity of the laminated structure of the preferred embodiment of the present invention as compared to a single layer structure.
Figure 7B:
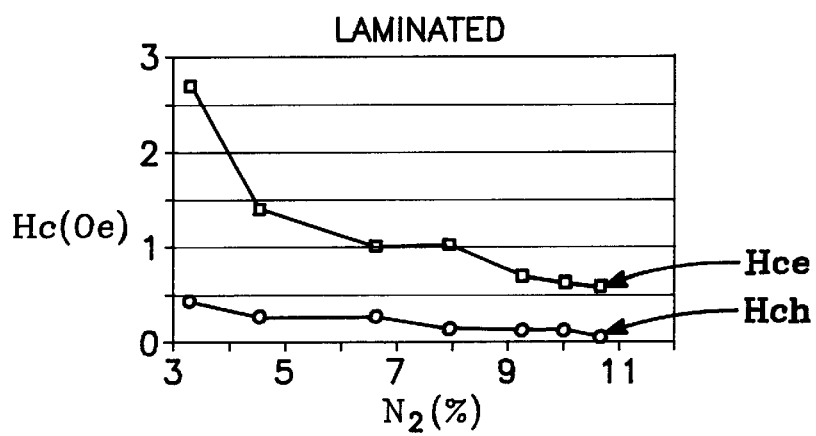

Laminating the yoke 50 with magnetic material allows the domain states of the high moment magnetic layers to have a well defined uniaxial anisotropy as shown in FIGS. 5A, 5B & 6. FIG. 5A shows the properties of a single layer of DC magnetron sputtered FeRhN. Curve 400 depicts single layer properties along the easy axis, while curve 410 depicts its properties along the hard axis. FIG. 5B shows the improved properties of FeRhN when laminated with CoZrCr deposited by DC magnetron sputtering. Curve 430 depicts the laminated structure's properties along the easy axis, while curve 420, which is generally linear, depicts the its properties along the hard axis. FIG. 6 illustrates the desired anisotropic alignment provided by the laminated structure of the preferred embodiment of the invention. In FIG. 6, the bulk of the domain states 90 are aligned perpendicular to the direction of flux through the yoke 50 and pole tip 40. This improves the high frequency performance of the head. FIGS. 7A & 7B show the improvement in easy and hard axis coercivity, $H_{ce}$ and $H_{ch}$ respectively, of laminated FeRhN/CoZrCr structures as compared to single layer FeRhN. FIG. 7B has a distinct easy and hard axis coercivity values thus illustrating the strong induced uniaxial anisotropy.

Figure 8:
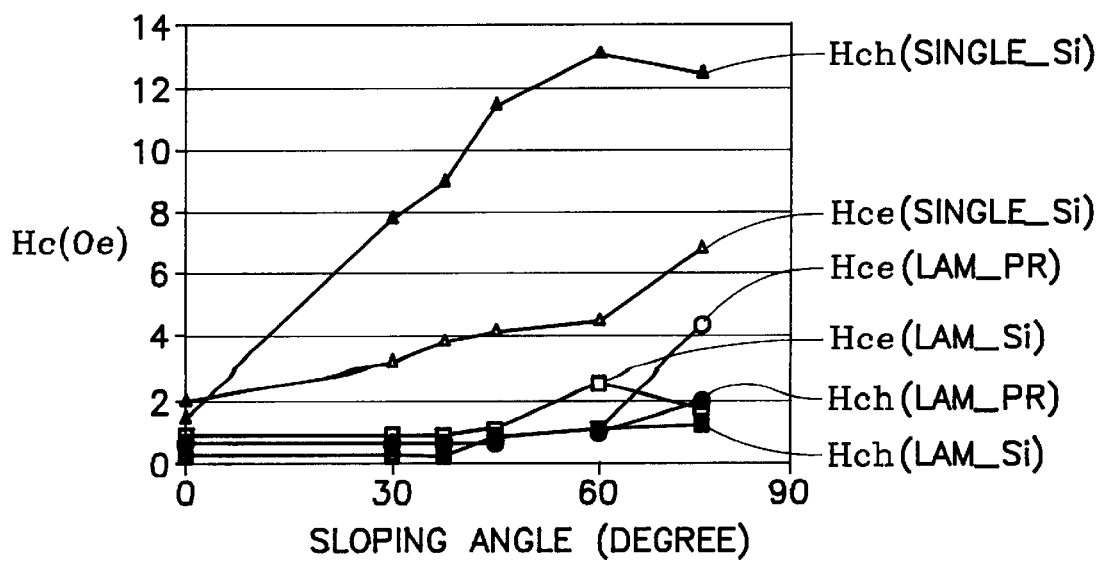
FIG. 8 illustrates the improved coercivity of the laminated structure of the preferred embodiment of the present invention when deposited over sloped surfaces as compared to a single layer structure.

FIG. 8 shows the improved soft magnetic properties of laminated FeRhN/CoZrCr as compared to a single layer FeRhN structure when deposited on sloping surfaces. The laminated structure showed improved easy axis $H_{ce}$, and hard axis $H_{ch}$ coercivity, when deposited on sloping surfaces of silicon, Si, and photoresist, PR. As illustrated, $H_{ch}$ was reduced from about 10 Oe for the single layer structure, to less than 2 Oe for the laminated structure, when deposited on a slope of about 45 degrees.

Figure 9A:
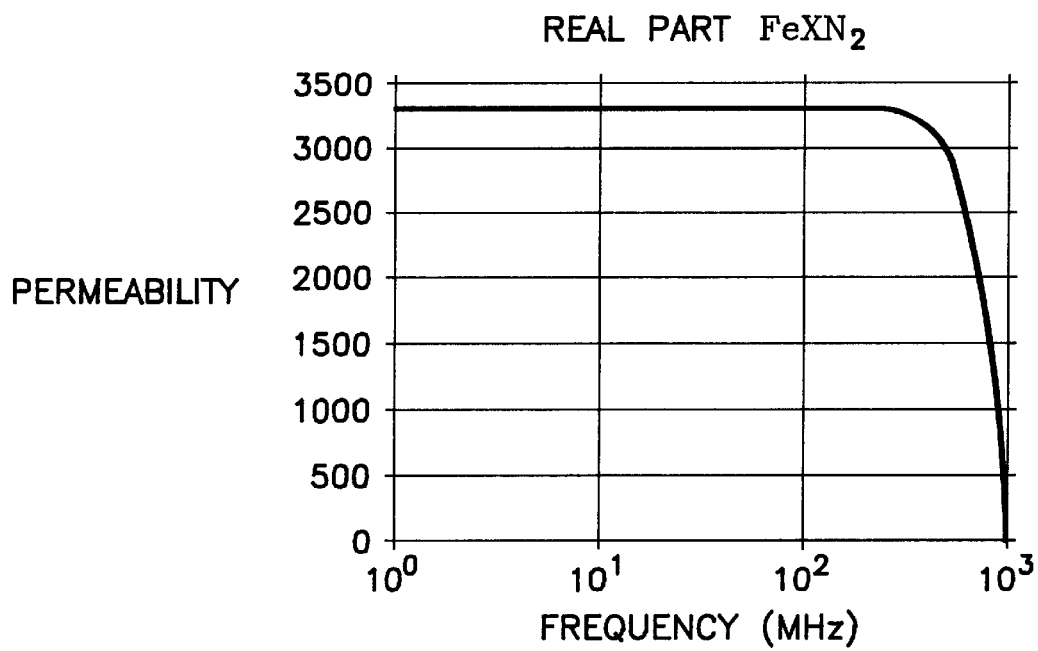
FIGS. 9A & 9B depict the expected frequency roll of a write head made in accordance with the preferred embodiment of the present invention.
Figure 9B:
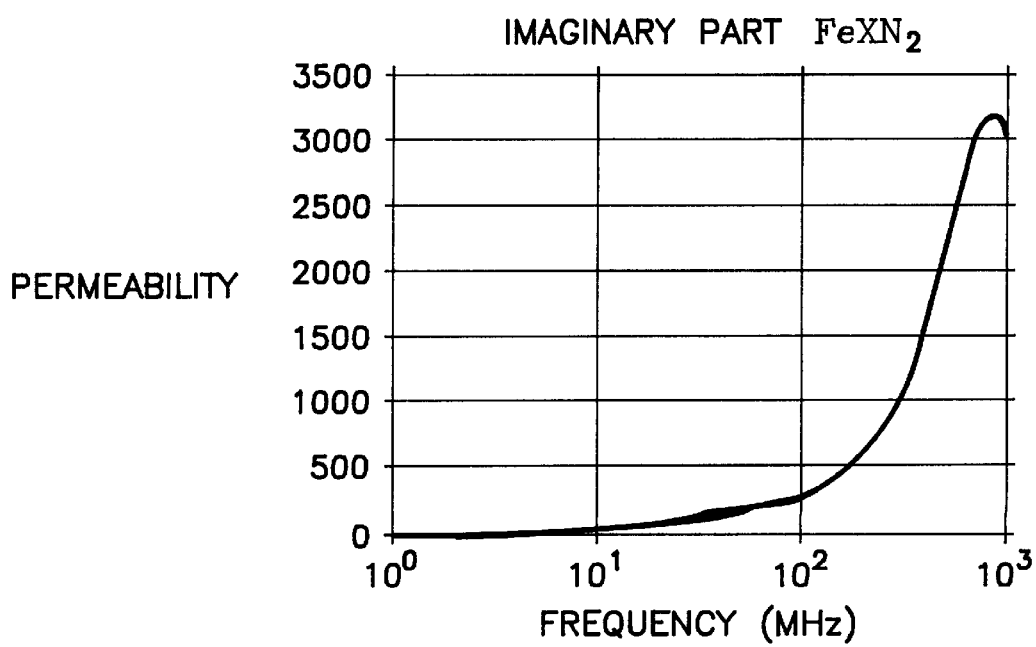

FIGS. 9A & 9B illustrate the high frequency roll off of the permeability of an FeRhN laminated head having 20 layers of CoZrCr lamination. As illustrated in FIGS. 9A & 9B, the structure of the present invention is expected to provide operating frequencies approaching 1 Gigahertz.

Although some embodiments of the present invention may have alternating layers of only high moment magnetic and amorphous magnetic materials, other multilayer embodiments may have additional lamination layers formed of insulating material so long as it does not interfere with the exchange coupling between the high moment material and the amorphous magnetic material. In a typical application employing additional insulating layers, each of the high moment material layers is adjacent at least one amorphous laminating layer. This allows exchange coupling between the high moment layer and the amorphous magnetic layer, as discussed above, while providing the known benefits of lamination with insulating layer. As such, any known insulation material, such as for example $SiO_2$, may be used for additional laminating layers.

While the preferred embodiments of the present invention have been described in detail above, many changes to these embodiments may be made without departing from the true scope and teachings of the present invention. The present invention, therefore, is limited only as claimed below and the equivalents thereof.

What we claim is:

1. A thin film write head comprising:
    a) a first pole structure comprising a laminated yoke;
    b) the laminated yoke comprising adjacent first and second magnetic materials;
    c) the first material having a magnetic structure such that there is no permanent uniaxial anisotropy state existing in the first material in the absence of the second material; and
    d) the first material having a thickness such that the first material has a uniaxial anisotropy induced by exchange coupling with at least one layer of the second material and such that the first and second magnetic materials have a single anisotropy behavior.

2. The thin film head of claim 1 wherein the yoke is formed by DC magnetron sputtering.

3. The thin film head of claim 2 wherein the second material has a deposition induced uniaxial anisotropy.

4. The thin film head of claim 2 wherein a uniaxial anisotropy is defined in the second material by annealing.

5. The thin film head of claim 1 wherein the second material is a high resistivity magnetic material.

6. The thin film head of claim 1 wherein the second material is an amorphous alloy.

7. The thin film head of claim 6 wherein the first material is a high moment magnetic material.

8. The thin film head of claim 1 wherein the second material comprises cobalt.

9. The thin film head of claim 8 wherein the second material consists essentially of cobalt zirconium chromium.

10. The thin film head of claim 8 wherein the first material is comprised of a material selected from the group consisting of, iron, nitrogen and alloys of iron nitride.

11. The thin film head of claim 1 wherein the first pole structure further comprises a laminated pole tip comprising the first and the second material.

12. The thin film head of claim 11 wherein the pole tip and yoke are integrally formed.

13. The thin film head of claim 1 further comprising a laminated second pole structure.

14. The thin film head of claim 1 wherein the yoke is formed of successive layers of the first and second magnetic material, and wherein the layers of the first material have a uniaxial anisotropy induced by the layers of the second material.

15. A thin film head comprising:
   a) a write head comprising:
      i) a laminated yoke comprising adjacent first and second magnetic materials;
      ii) the first material having a magnetic structure such that there is no permanent uniaxial anisotropy state existing in the first material in the absence of the second material;
      iii) the first material having a thickness such that the first material has a uniaxial anisotropy induced solely by exchange coupling with at least one layer of the second material and such that the first and second magnetic materials have a single anisotropy behavior; and
   b) a read head comprising a read sensor element.

16. The thin film head of claim 15 wherein the first material is a high moment magnetic material, and wherein the second material is an amorphous alloy, and wherein the uniaxial anisotropy of the first material exchange couples with the second material to provide a well defined uniaxial anisotropy in the second.

17. The thin film head of claim 16 wherein the second material has high resistivity.

18. The thin film head of claim 16 wherein the second material comprises cobalt, and wherein the first material comprises material selected from the group consisting of: iron, nitrogen, and alloys of iron nitride.

19. The thin film head of claim 18 wherein the second material consists essentially of cobalt zirconium chromium, and wherein the first material comprises iron rhodium nitride.

20. A thin film write head comprising:
   a) a first pole structure comprising a laminated yoke comprising adjacent first and a second magnetic materials;
   b) the first material being a high moment material having a crystalline structure and having a magnetic structure such that there is no permanent uniaxial anisotropy state existing in the first material in the absence of the second material;
   c) the second material being a magnetic material alloy having an amorphous structure and being formed with an as deposited uniaxial anisotropy state; and
   d) the first material having thickness such that the first material has a uniaxial anisotropy induced by exchange coupling with at least one layer of the second material and such that the first and second magnetic materials have a single anisotropy behavior.

21. The thin film write head of claim 20 wherein the first material comprises material selected from the group consisting of iron, nitrogen, and alloys of iron nitride, and wherein the second material comprises cobalt.

22. The thin film write head of claim 21 wherein the first material comprises FeRhN, and wherein the second material comprise CoZrCr.

23. The thin film write head of claim 22 wherein the thickness of the first material to the thickness of the second material is about 4 to 1.

* * * * *